(12) United States Patent
Williams et al.

(10) Patent No.: US 6,567,875 B1
(45) Date of Patent: May 20, 2003

(54) USB DATA SERIALIZER

(75) Inventors: Mark R. Williams, San Jose, CA (US); Michael Schumacher, San Jose, CA (US)

(73) Assignee: OPTI, Inc., Mountain View, CA (US)

(*) Notice: Subject to any disclaimer, the term of this patent is extended or adjusted under 35 U.S.C. 154(b) by 0 days.

(21) Appl. No.: 09/286,044

(22) Filed: Apr. 5, 1999

(51) Int. Cl.[7] .............................................. G06F 13/00
(52) U.S. Cl. ..................................................... 710/302
(58) Field of Search .............................. 710/11, 15, 30, 710/62–65, 71–74, 103–106, 129, 23–28, 300–304, 305, 306, 311, 313, 315

(56) References Cited

U.S. PATENT DOCUMENTS

| | | | |
|---|---|---|---|
| 5,761,537 A | | 6/1998 | Sturges et al. |
| 5,818,948 A | | 10/1998 | Gulick |
| 5,835,791 A | * | 11/1998 | Goff et al. .................... 710/62 |
| 5,935,224 A | * | 8/1999 | Svancarek et al. ............ 463/36 |
| 5,951,667 A | * | 9/1999 | Abramson ................... 710/129 |
| 5,958,054 A | * | 9/1999 | O'Connor et al. .......... 713/300 |
| 6,040,792 A | * | 3/2000 | Watson et al. .............. 341/100 |
| 6,061,746 A | * | 5/2000 | Stanley et al. ................ 710/10 |
| 6,067,589 A | | 5/2000 | Mamata ........................ 710/63 |
| 6,098,120 A | * | 8/2000 | Yaotani ......................... 710/16 |
| 6,119,195 A | * | 9/2000 | Ellis et al. ................... 710/129 |
| 6,128,732 A | * | 10/2000 | Chaiken ......................... 713/2 |
| 6,131,125 A | * | 10/2000 | Rostoker et al. ............ 709/250 |
| 6,131,134 A | * | 10/2000 | Huang et al. ............... 710/302 |
| 6,185,641 B1 | * | 2/2001 | Dunnihoo .................... 710/56 |
| 6,191,713 B1 | * | 2/2001 | Ellis et al. ................... 341/100 |
| 6,199,122 B1 | * | 3/2001 | Kobayashi .................. 709/214 |
| 6,216,052 B1 | | 4/2001 | Gulick |
| 6,218,969 B1 | * | 4/2001 | Watson et al. .............. 341/100 |

FOREIGN PATENT DOCUMENTS

| | | | |
|---|---|---|---|
| WO | 99/08196 | 2/1999 | ................... 13/14 |

OTHER PUBLICATIONS

Compaq, Digital Equipment Corporation, IBM PC Company, Intel, Microsoft, NEC, and Northern Telecom Publication, "Universal Serial Bus Specification, Revision 1.0," Jan. 15, 1996.

Compaq, Intel, Microsoft, and NEC Publication, "Universal Serial Bus Specification, Revision 1.1," Sep. 23, 1998.

Intel Publication, "Universal Host Controller Interface (UHCI) Design Guide, Revision 1.1," Mar. 1996, Intel Corporation.

* cited by examiner

*Primary Examiner*—Xuan M. Thai
(74) *Attorney, Agent, or Firm*—Warren S. Wolfeld; Haynes Beffel & Wolfeld LLP

(57) ABSTRACT

A system and method for emulating a USB peripheral device is disclosed. The system utilizes a USB programming and operating interface to interact with the host but formats the data into a format usable by a non-USB peripheral device. Such a system consumes less real estate and power than a USB interface controller and USB peripheral, but remains compatible with software designed to interact with those USB devices.

22 Claims, 8 Drawing Sheets

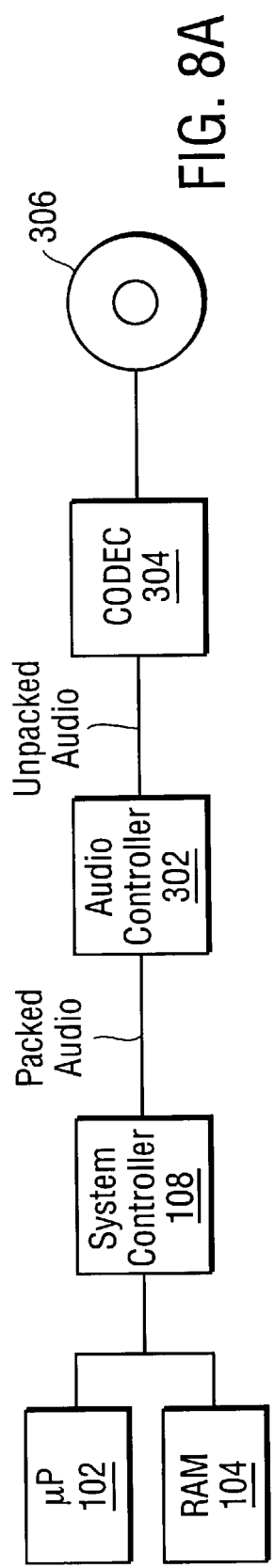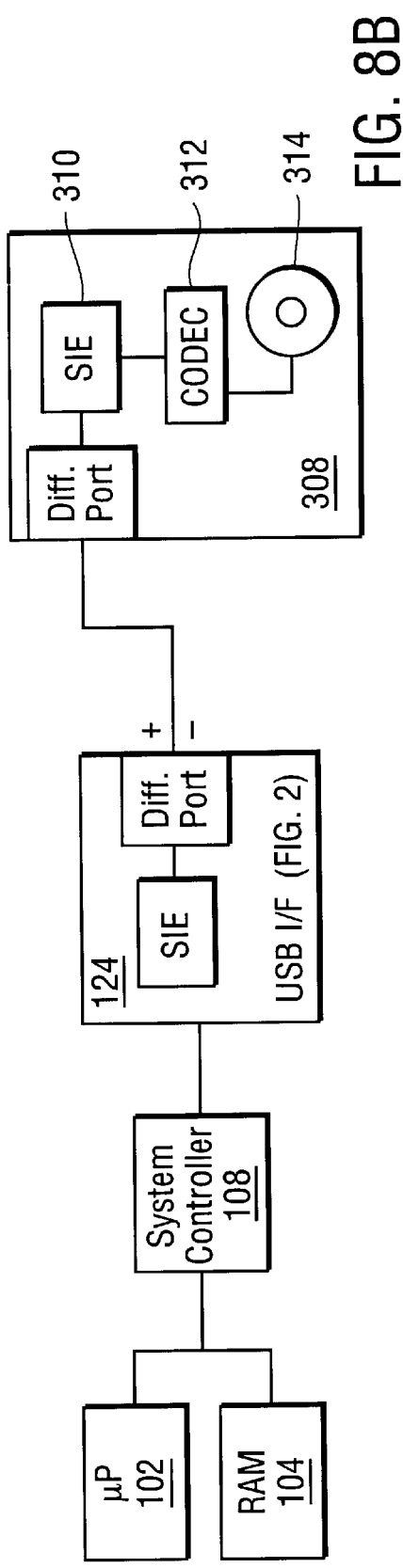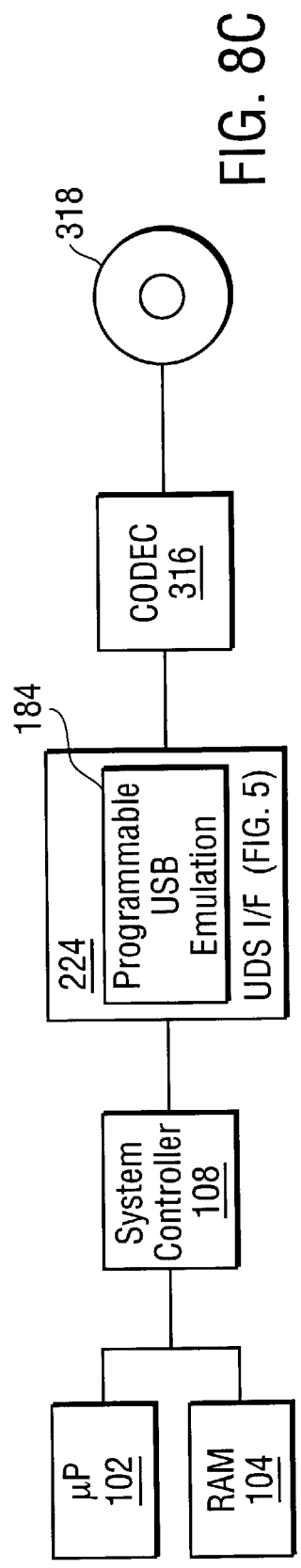

USB DATA SERIALIZER

FIELD OF INVENTION

The invention relates to data Input/Output (I/O) interfaces, and particularly the invention relates to the Universal Serial Bus (USB) and utilizing data intended for USB devices with non-USB devices.

BACKGROUND

The Universal Serial Bus (USB) is a well-known standard in the computer design and related industries. The USB bus is designed to be a user-friendly interface used to connect a personal computer (PC), including a laptop and like devices, to various external peripherals, e.g., a speaker, mouse, or keyboard. USB allows users to "hot-plug" (or "hot-swap") a device into a USB connector and be assured that the device will be recognized by the Operating System (OS) of the PC without conflict with other devices. More specific information regarding the USB standard is available in the Universal Serial Bus Specification, Rev. 1.0 (Jan. 15, 1996), available on the World Wide Web at www.usb.org and incorporated herein by reference.

An example of a system 100 that may utilize the USB standard is shown in the functional block diagram of FIG. 1. FIG. 1 shows a processor 102 coupled to a host bus 106, and a memory 104, e.g., RAM, coupled to a memory bus 107. The host bus 106 and memory bus 107 are each in turn coupled to a system controller 108. In some systems, the system controller is referred to as a "chipset." The system controller 108 interfaces the processor to various peripheral devices in the system. The peripheral devices in the system are coupled to one or more "system buses." For instance, some peripherals 112, 114, such as a disk drive controller, may reside on an ISA bus 109 (an Industry Standard Bus). Other peripherals 118, 120 reside on the PCI bus 110, which is a newer and generally the more favored standard system bus compared to ISA. Both the ISA standard and PCI standard are well-known in the art. A USB interface controller 124 is also coupled to the PCI bus 110. The USB interface controller 124 is couplable to a USB peripheral device 132, which is typically detachable from the USB interface 124.

A more detailed example of a USB interface controller unit 124 is shown in the block diagram of FIG. 2. USB interface controller 124 includes a host controller 140 coupled to the PCI or other system bus 110. The host controller 140 interfaces unit 124 to system bus 110, communicating data to and from a host system memory (e.g., memory 104) and controlling the flow of that data through USB interface controller 124. The host controller 140 transmits data to serial interface engine (SIE) 142. SIE 142 converts the data received in parallel format into a serial format and also formats the data, including any necessary framing, in accordance with the USB specification.

Once serialized and formatted, data is passed to a port 146 or 148. As shown, a USB interface controller may have multiple ports, e.g., 146, 148.

When serial data is received by ports 146 or 148 from a USB peripheral device, the data is passed to SIE 142, which decodes the data, i.e., extracts the raw data, and converts the raw data into a parallel format. SIE 142 then transmits the raw data to host controller 140, which ultimately communicates the data to host system 100.

As indicated on ports 146, 148 the USB interface controller 124 utilizes a two-wire differential signaling technique. Each port produces a positive signal 150 and a related negative signal 152, both of which are transmitted to a connected USB peripheral device 132. Because of this differential signaling technique as well as the long cables often utilized with USB peripheral devices (e.g., up to 5 meters), the ports on both the USB interface controller and USB peripheral devices are complex and expensive, requiring complex analog circuits with programmable drive strength and rise/fall characteristics. Such complex ports also tend to be physically large, consuming considerable die space compared with ports used with other buses and/or bus standards.

An example of a USB peripheral device 132 is shown in the block diagram of FIG. 3 as a USB speaker. Of course other USB peripheral devices are available, and a USB speaker is utilized for illustrative purposes only. The USB peripheral device 132 includes a differential port 160 and a Serial Interface Engine (SIE) 162. The port 160 and SIE 162 are similar to those found on the USB interface controller 124 on host system 100 and will be found in almost all types of USB peripheral devices. Once received, the SIE 162 decodes the signal and outputs raw data to CODEC 164, which performs analog conversion and otherwise prepares the data for transmission to speaker 166.

Although the USB standard includes the benefit of being user-friendly, supporting the USB standard consumes not only considerable real estate, e.g., to support the USB data formatting protocol as well as differential signaling, but also consumes considerable power, where both factors contribute to escalating PC costs. In the laptop market, where devices must not only be physically small, but must also consume relatively small amounts of power and still remain at a competitive price, these factors are significant obstacles.

Moreover, many vendors and consumers are demanding that PCs and PC-like devices support various amenities such as sound. For these reasons, various operating system and software developers are developing the software, including device drivers, to support USB peripheral devices and are demanding of PC and PC-like device manufacturers that a "user-friendly" USB interface controller be in place to provide an easy-to-use environment for end-users. A system that attempts to save power, real estate, and/or ultimate cost by sacrificing the USB interface controller will be at a disadvantage in that various vendors software will not be operable with or permitted to be operated with such systems.

SUMMARY

Therefore, it is desirable to develop a method of utilizing the USB bus interface to the host system, but minimizing the costs of doing so in terms of real estate, power, and expense. To do so, a system and method is disclosed that emulates a USB peripheral device. Such a system is referred to herein as a USB Data Serializer (UDS) and interacts with the host system bus in a manner similar to that done by a host controller in a conventional USB interface controller. In other words, the UDS utilizes a system bus interface that appears to the host identical to a conventional USB system bus interface to communicate with the host. Instead of being couplable to a USB peripheral device, however, the UDS is couplable to non-USB devices, such as TTL devices for example. The UDS further includes a data formatter, which in many embodiments is programmable. The data formatter formats, or translates, data received from the host system bus via the system bus interface into a format usable by the non-USB device. Such format can be virtually any format and is determined only by which non-USB device is intended to be coupled to the system.

The UDS further includes a stored USB device identifier. This identifier is programmable in some embodiments. The USB device identifier is provided to the host system. The host system responds by configuring the system to operate with the identified USB device. The host system then communicates with the UDS in the same way it communicates with a USB interface controller, i.e., software that is used with USB devices in the host is still used. The UDS then formats the information received for use by the non-USB device. Likewise, when the UDS receives information from the non-USB peripheral device, the UDS de-formats the data and provides it through the system bus interface to the host system.

Thus, by use of a system and method in accordance with the invention, non-USB peripheral devices can be used with systems designed to interact with USB peripherals. Such a system will demand less real estate, less power, and will cost less than its USB counterpart, making such a system particularly useful in laptop and portable PC and PC-like devices.

DESCRIPTION OF THE DRAWINGS

The invention will be described with respect to particular embodiments thereof, and reference will be made to the drawings in which like numbers designate like parts and in which:

FIGS. 8A–8C are functional block diagrams of various ways to implement a speaker, including a non-USB, non-UDS method, a USB method, and a UDS method in accordance with the invention.

DETAILED DESCRIPTION

To overcome the disadvantages discussed above, the invention takes advantage of the USB software interface, such as that developed by Intel (UHCI) or Compaq (OHCI), but does not require use of the relatively high-cost differential signaling interface of USB. A system in accordance with the invention, is often referred to herein as a USB Data Serializer (UDS), and is designed to emulate a USB device. By emulating a USB device, the UDS can support various non-USB devices, but the OS interacts with the UDS as if a USB peripheral device were in fact coupled to the system.

Figure 1:
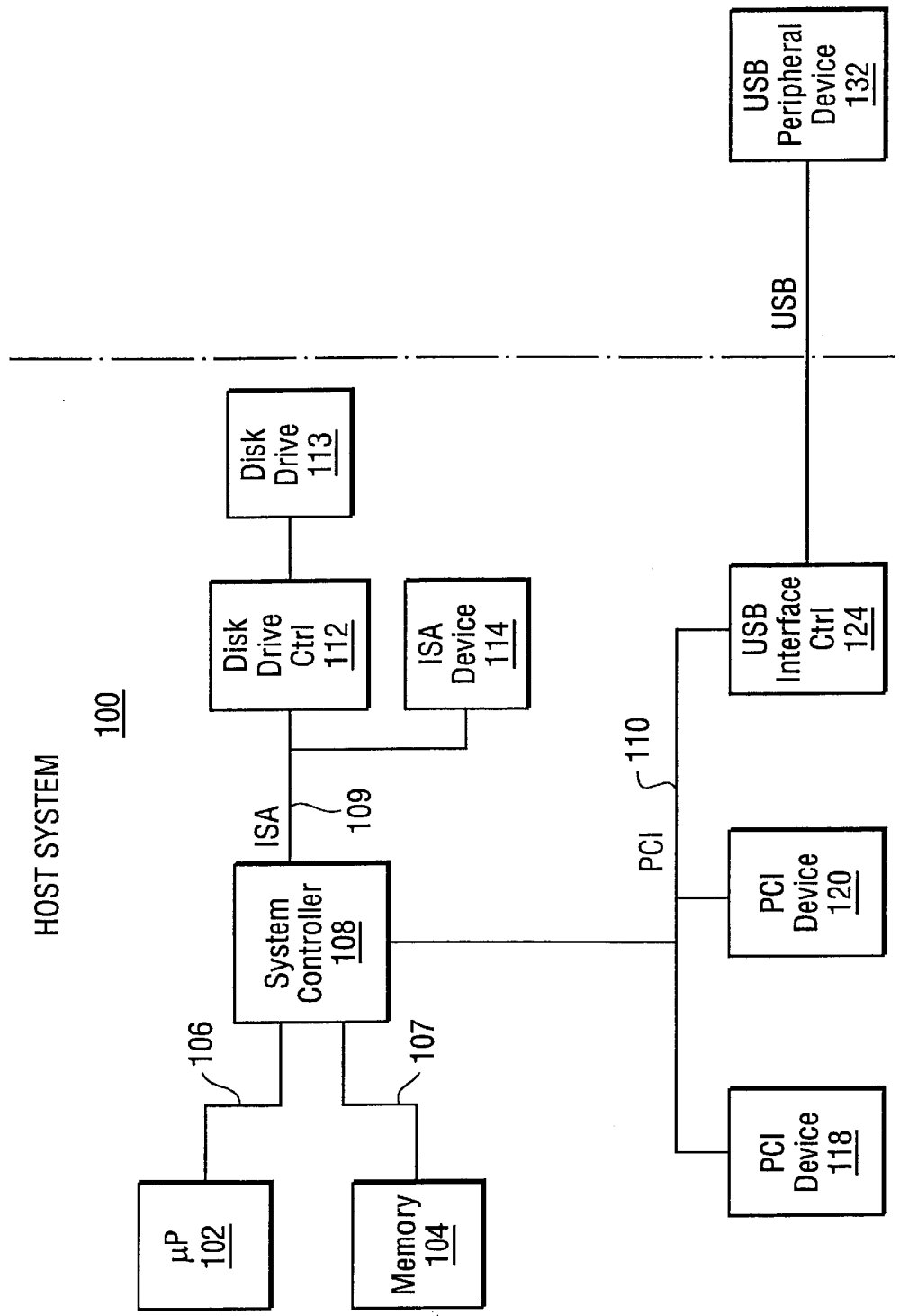
FIG. 1 is a functional block diagram of a system designed for interaction with USB peripheral devices.
Figure 4:
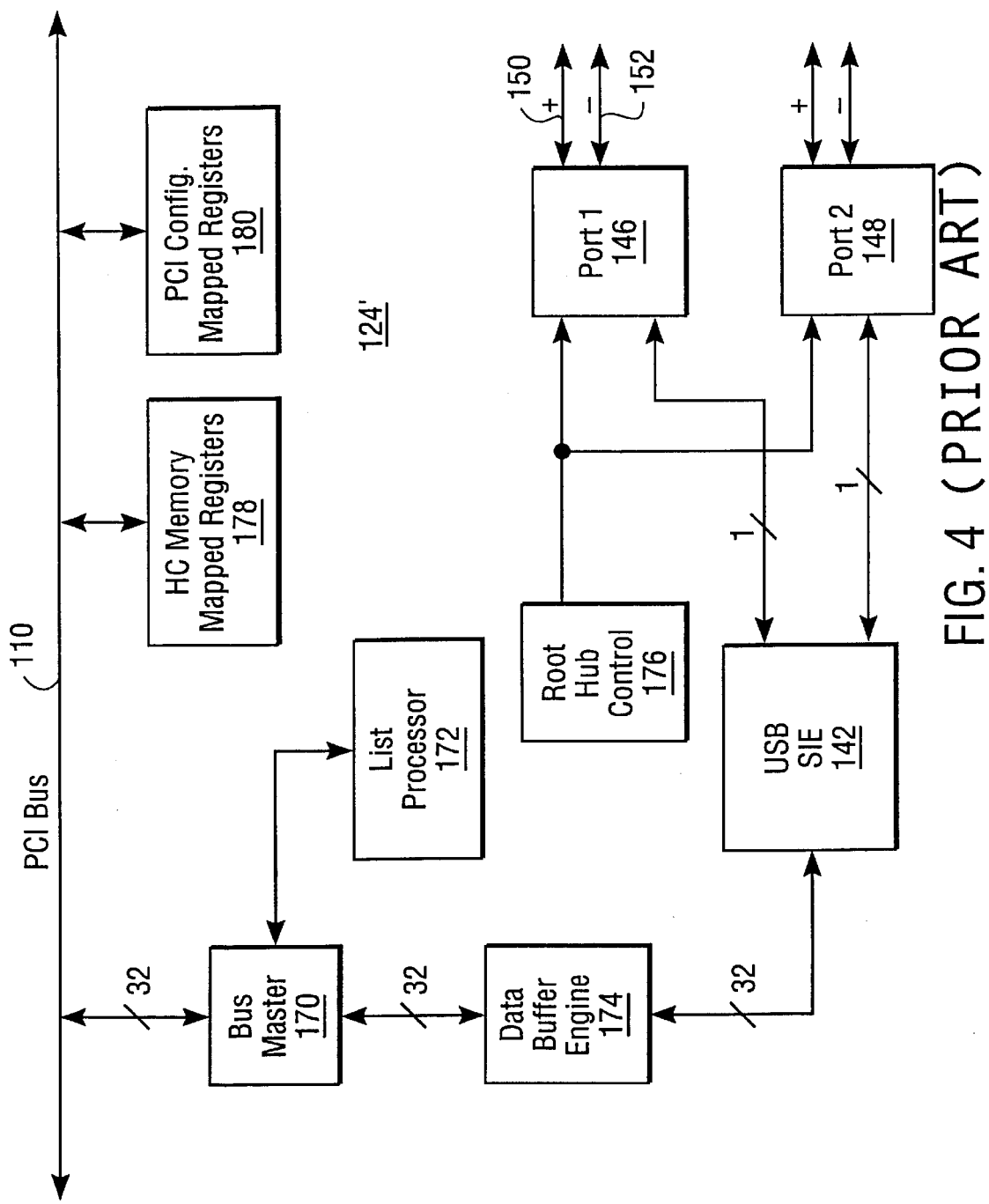
FIG. 4 is a functional block diagram of a USB interface control unit, shown in more detail than FIG. 2.

Before getting into the details of a UDS system in accordance with the invention, reference is first made to FIG. 4 and a particular implementation of a USB interface controller unit, such as USB interface controller unit 124 shown in FIG. 1. FIG. 4 is similar in many respects to FIG. 2, however host controller 140 is set out more specifically and other details are shown. Hence the system shown in FIG. 4 is referenced by 124'.

As shown in FIG. 4, PCI bus 110 (or other system bus) is coupled to bus master 170. Bus master 170 is used to aid in arbitration for and gain access to PCI bus 110. Bus master 170 can engage in DMA transfers over the PCI bus, obtaining various information from host system memory as well as delivering various information to be stored in host system memory (e.g., memory 104).

Bus master 170 is coupled to list processor 172. List processor 172 processes a linked list of the memory locations of the data that is to be transferred or where received data is to be placed and instructs the bus master 170 as to which address needs to be accessed.

Bus master 170 is further coupled to data buffer engine 174. Upon retrieving information from system memory, bus master 170 communicates that information to data buffer engine 174. Data buffer engine 174 is somewhat like a FIFO device, however it further includes flow control, so as to control the rate at which data is transferred to the USB SIE device 142. Likewise, data buffer engine 174 receives data from SIE 142 and acts as a FIFO and flow control device in the opposing direction, passing data to bus master 170, which ultimately arbitrates for PCI bus 110 access and delivers the information to system memory 104.

SIE 142 takes the raw data received in parallel from data buffer engine 174 and serializes that data. In addition, SIE formats the data into proper USB protocol format, including placing the data in appropriate frames with the appropriate flags inserted. More information with respect to the format of data in USB devices can be found in the USB specification discussed previously.

Once serialized and formatted, data is transferred from SIE 142 to a port, e.g., Port 1 146. As shown in FIG. 4, USB interface controller unit 124' can have one or more ports, and two ports 146 and 148 are shown in FIG. 4 for illustrative purposes. It is to be understood that more or fewer ports may be included in various implementations of USB interface controller units. Each port outputs the encoded serial data in a differential signal format having a positive line 150 and a negative line 152.

In addition, root hub control unit 176 is used to control the respective ports 146 and 148. Root hub control 176 may enable or disable each respective port and/or control the direction of data flow from the respective ports, among other functions.

USB interface device 124' also includes several register banks. These register banks include PCI configuration registers 180, used to configure the device for use on a PCI bus in accordance with the PCI standard. As known in the art, PCI configuration registers are typically accessed once and include information about the device including whether it requires I/O or memory space and how much. Additionally, HC memory mapped registers 178 are included and are used to store various information and instructions required of the USB interface controller unit, such as the start and end addresses of the linked list of messages. The HC memory mapped registers appear to device 124' as system memory, although access will be faster.

In operation upon power-up or upon "hot-plug" of a USB peripheral device, the host system sends a query to the USB peripheral device (not shown in FIG. 4), via the USB interface controller 124', requesting device identification information. The USB peripheral device sends the information back through the USB interface device 124' to the host system. When the host system receives the identifying information, it configures the system for operation with the respective peripheral by loading various device drivers and relaying other configuration information to the USB peripheral device via the USB interface device 124'. In this manner, when an end-user adds a USB peripheral device to his or her system, the end-user does not have to engage in any system configuration, making USB a user-friendly system.

However, as discussed previously, the differential ports 146, 148 in the USB devices are complex, requiring considerable die space as well as consuming considerable power. Therefore, it is desirable to eliminate the differential ports, especially for smaller PC systems such as laptops, and especially when both the USB controller 124 and USB peripheral device 132 are mounted on the same printed circuit board (PCB). However, because of vendor and end-user demand, it is still desirable to maintain compatibility with USB software, e.g., device drivers, on the host system.

Figure 5:
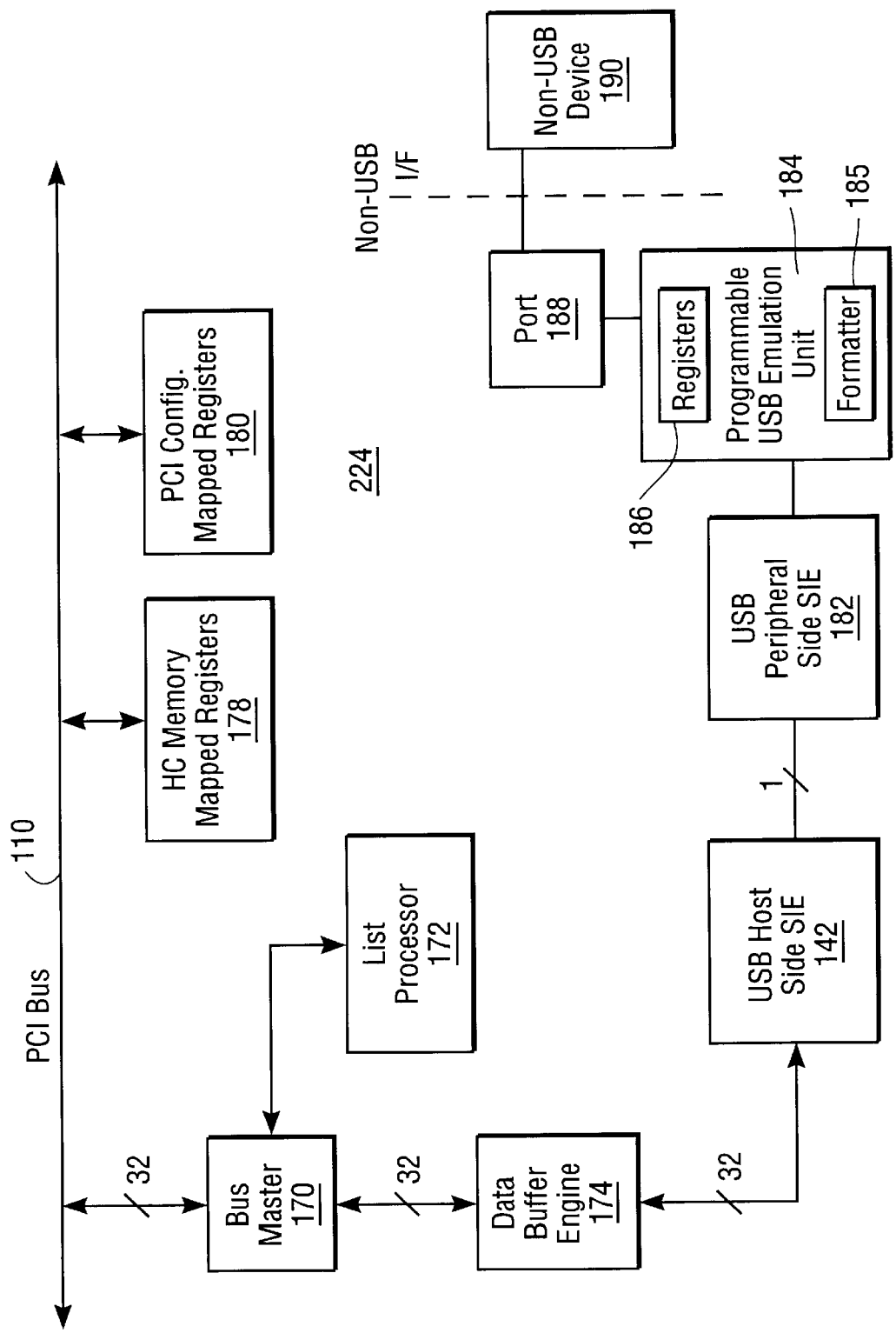
FIG. 5 is a functional block diagram of one embodiment of a system in accordance with the invention.

To meet these desires, one embodiment of a system in accordance with the invention is shown in FIG. 5. FIG. 5 shows a Universal Data Serializer (UDS) 224, which can be used to replace USB interface controller 124 shown in FIG. 1. As seen in FIG. 5, many of the elements in UDS 224 are similar to those shown for USB device 124' in FIG. 4, including bus master 170, list processor 172, data buffer engine 174, HC memory mapped registers 178, and PCI configuration registers 180. Although this and other embodiments of the invention are described as interacting with a PCI bus, it is to be understood that a PCI bus is used for illustrative purposes only and that an embodiment in accordance with the invention can interoperate with other types of system busses.

In addition, UDS 224 includes SIE 142, which is much the same as that shown in FIG. 4. Instead of SIE 142 being coupled to differential ports, however, SIE 142 is coupled to SIE 182. SIE 182 is generally similar to the SIE typically found in a USB peripheral device. Here, USB host side SIE 142 receives raw parallel data and then serializes and formats the data as would be done in a conventional USB system. The serialized and formatted data is transmitted to USB peripheral side SIE 182, which decodes the data, i.e., takes the data out of USB format. The raw serial data is communicated to programmable USB Emulation Unit 184. In one embodiment, both SIEs reside on the same logic device with no intervening differential circuitry.

The UDS 224 supports non-USB serial devices. These non-USB devices will generally not require differential signals and may be digital, e.g., TTL, devices. For instance, a UDS may be coupled to a TTL keyboard controller, a UART, or a CODEC. The UDS, therefore, in its programmable USB Emulation Unit 184, includes a data formatter 185. The data formatter 185 can place data into any programmed format, and is not limited to the USB protocol of passing data. One format, for example, could be that required for an AC97 CODEC. Another format would be that required for a non-USB mouse. In addition, the data formatter in many embodiments will convert data, if received in a parallel format, to a serial format. Some embodiments, however, will allow data to remain in a parallel format.

The data formatted by the programmable USB emulation unit 184 is conveyed to the port 188. In some embodiments, port 188 may simply be a buffer or one or more conductors if the non-USB device is on the same board as UDS 224. Alternatively, port 188 may be a connector for use with off-board devices.

Since the format required by the non-USB device could be almost any format known currently or in the future, on system power-up, programmable USB emulation unit 184 is programmed, for instance with a serial ROM device or by other methods, to be able to perform the formatting functions required. Programmable USB emulation unit could even be programmed to place data into the format specified by the USB specification.

In addition, in order to fully emulate a USB device, the host system needs to be able to query for and receive a valid USB identifier. To accomplish this task, UDS registers 186 are included in UDS 224 and are also programmed at power-up. These registers store a USB device identifier. For instance, if the non-USB device 190 is to be a mouse device, then UDS registers 186 are programmed with an identifier that corresponds to a USB mouse device. Hence, when the host operating system queries via device 224 for a USB device identifier, programmable USB emulation unit 184 intercepts the query and is designed and/or programmed to access UDS registers 186. Programmable USB emulation unit 184 retrieves the USB device identifier from UDS registers 186 and then transmits the identifier to the host system in the normal USB fashion. The host system loads the various device drivers which correspond to that USB identifier, e.g., USB mouse, and engages in any other tasks required for configuring the system for operation with (what the host "believes" to be) the identified USB device. When information is sent from the host system directed to the "USB mouse," programmable interface 184 receives that information and formats the information in the appropriate format for the non-USB device, e.g., a non-USB mouse.

In this manner, the UDS device 224, emulates the presence of a USB peripheral device. By doing so, current USB software, including device drivers, do not have to be rewritten, but can be used with other non-USB devices, making a system without USB devices compatible with those operating systems designed to be used with USB devices. Moreover, because the operating system of the host system typically interacts with the UDS in the same manner as it would a USB interface controller 124, utilizing the same or similar registers (e.g., HC memory mapped registers and PCI configuration registers) and the same or similar host controller, no additional code needs to be used at the host system to support the interaction of the host system with the UDS other than what already exists to support USB. Further, the system of FIG. 5 eliminates the differential ports required by USB systems, minimizing real estate taken by such ports as well as power consumption. Still, as shown in FIG. 6, real estate consumption can be reduced still further by use of another embodiment of a system in accordance with the invention.

Figure 6:
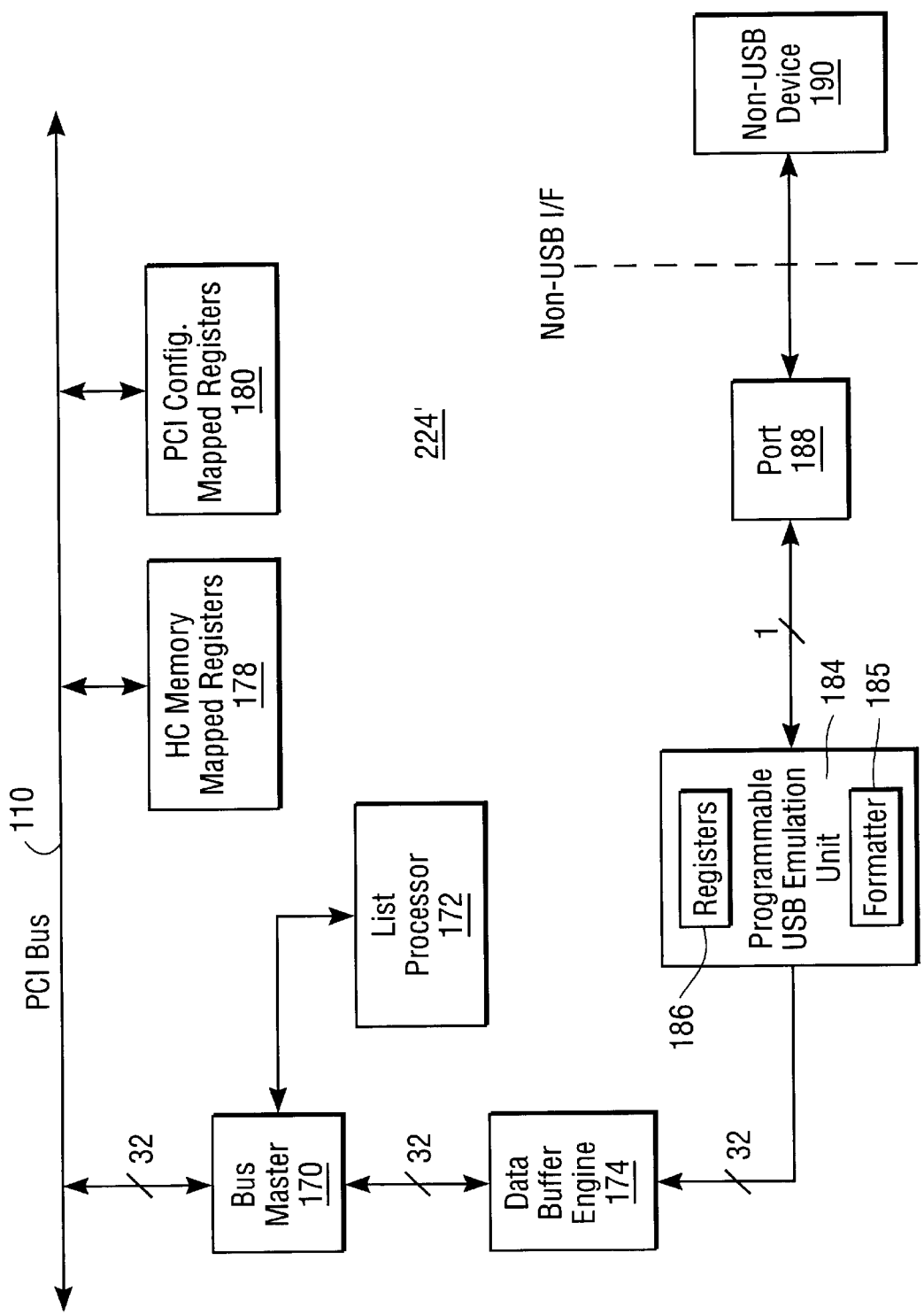
FIG. 6 is a functional block diagram of a second embodiment of a system in accordance with the invention.

As shown in FIG. 6 this second embodiment of a UDS, designated 224', utilizes most of the same elements as that shown in FIG. 5, however, the USB SIE units 142 and 182 have been eliminated. Hence, data received from data buffer engine 174 is provided directly to programmable USB emulation unit 184. Programmable USB emulation unit 184 includes a data formatter 185, which can be implemented in hardware, software, or firmware. Programmable USB emulation unit 184 formats the data, including any necessary serialization, into the appropriate format with formatter 185, typically not a USB format. The formatted data is passed to port 188, which ultimately conveys the information to non-USB device 190.

As in FIG. 5, port 188 in FIG. 6 may be a buffer, one or more conductors, and/or a connector. Further, although FIGS. 5 and 6 illustrate a UDS having only one port 188, it is to be understood that each of these devices can have one or more ports and that only one port is shown for purposes of illustration.

The system of FIG. 6 will act in much the same way as that in FIG. 5, except that the data will not be converted to the USB format unnecessarily. Such an implementation reduces the die space necessary for such a device, as well as minimizes power consumption. When the host system queries for the USB peripheral device identification, programmable USB emulation unit 184 is designed and/or programmed to retrieve such information from registers 186, which have been previously programmed or otherwise configured to include, among other things, a USB peripheral device identifier. Programmable USB emulation unit 184 will transmit the retrieved identifier back to the host system. The operating system will then load the device drivers that correspond to the USB device identifying information. For instance, if the identifying information is for a USB mouse the operating system will load a mouse driver. Or, if the identifying information is for USB speaker, a speaker driver will be loaded.

Upon receipt of information from the host intended for the identified USB device, the programmable USB emulation unit 184 formats the data into a format acceptable for the respective non-USB device coupled to it through port 188. Hence, the host system, upon querying the UDS 224 or 224', will "see" a USB peripheral device. In fact, in accordance with one embodiment of the invention, the UDS interfaces to the PCI bus and host system in the same manner as would the host controller in a conventional USB interface controller (see FIGS. 1 and 2).

Therefore, using a UDS system, a variety of non-USB devices can be utilized. These devices may be legacy devices or may simply be lower in power than other available devices. Moreover, the USB device drivers can be utilized to support a considerable number of these non-USB devices.

Although not shown in FIGS. 5 and 6, a UDS in accordance with the invention can be designed, in some embodiments, to have multiple ports, and thus be couplable to multiple non-USB devices simultaneously. These non-USB devices may each demand data in a different format. In such situations, programmable USB emulation units may be designed in various embodiments to include multiple data formatters, each programmed to translate data into a different format. Multiple stored USB device identifiers will also be included. When the host sends information destined for a particular "USB device," the programmable USB emulation unit will route the incoming data to the appropriate formatter.

Figure 7:
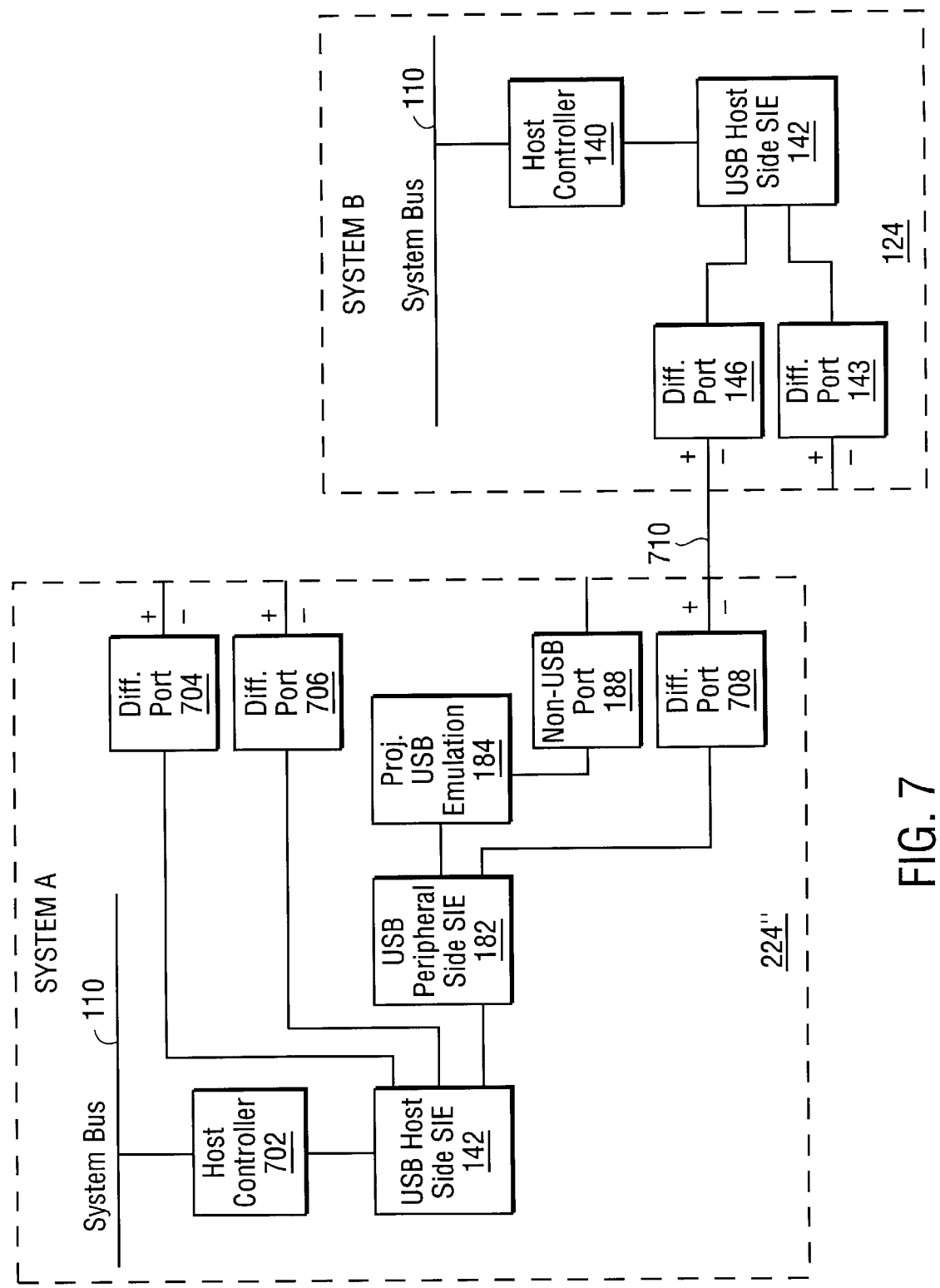
FIG. 7 is a functional block diagram of a third embodiment of a system in accordance with the invention.

Still another embodiment of the invention is shown in FIG. 7. The embodiment of the UDS device shown in FIG. 7 is a modification of the embodiment of FIG. 5, including bus master 170, list processor 172, and data buffer engine 174 (shown collectively in FIG. 7 as host controller logic 702), USB host side SIE 142, USB peripheral side SIE 182, programmable USB emulation unit 184, and non-USB port 188. In addition, UDS device 224" includes one or more differential USB ports 704, 706 coupled to USB host side SIE 142 as well as one or more differential USB ports 708 coupled to the USB peripheral side SIE 182.

Figure 2:
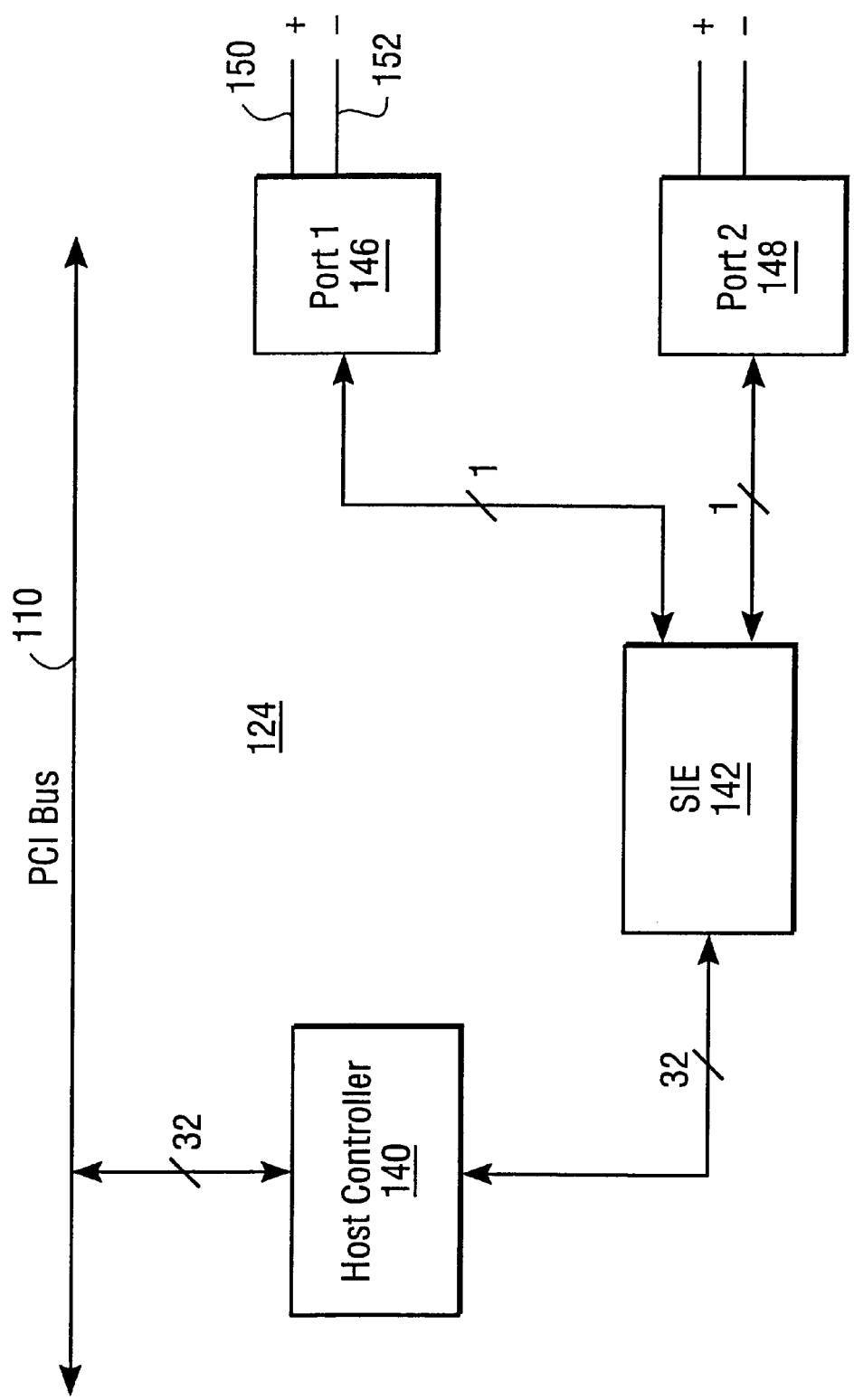
FIG. 2 is a functional block diagram of a USB interface control unit 124.
Figure 3:
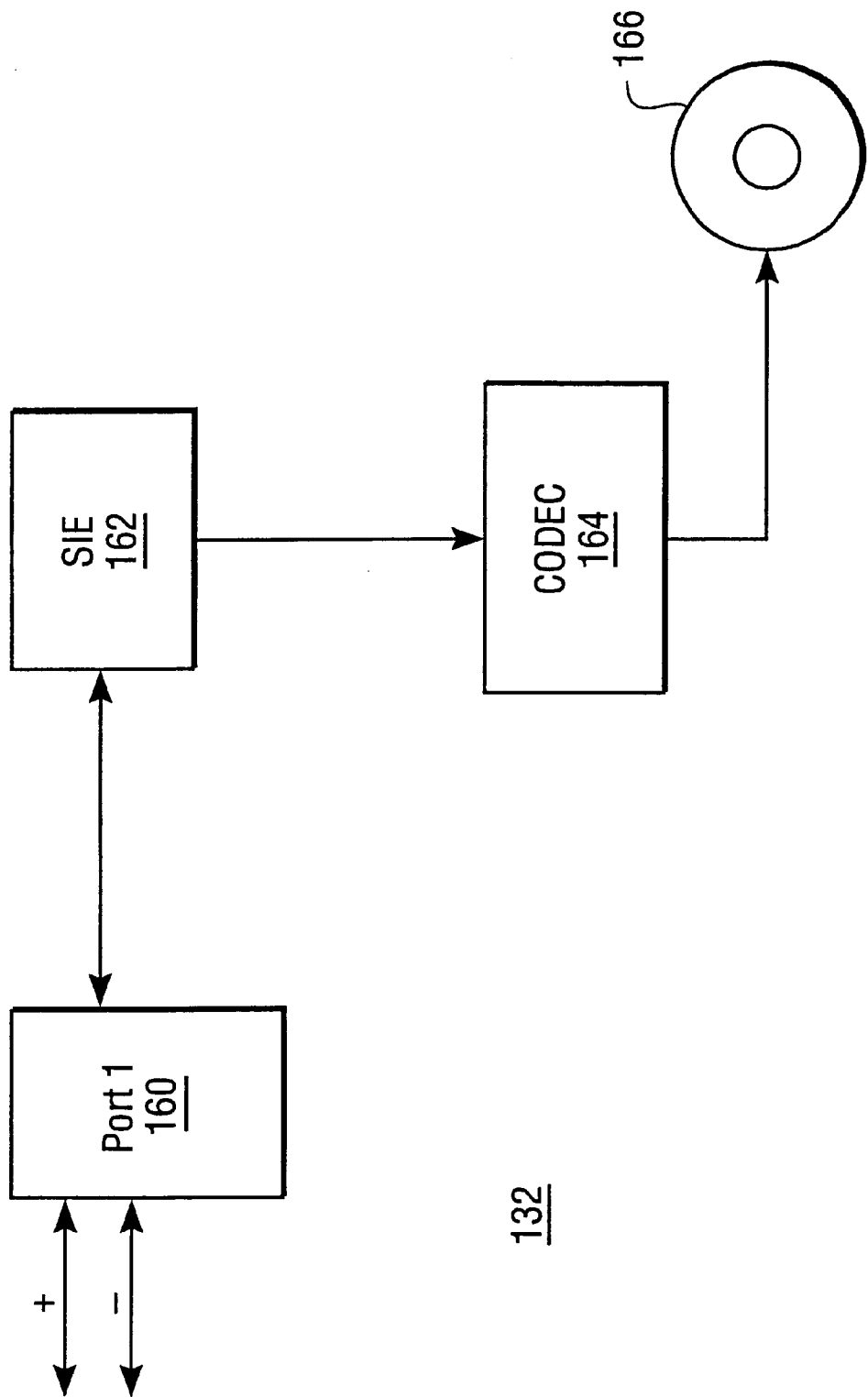
FIG. 3 is a functional block diagram of a USB peripheral device.

Ports 704, 706 coupled to USB host side SIE 142 allow device 224" to additionally support USB peripheral devices in the conventional manner as described with respect to FIGS. 2.

Port 708 coupled to USB peripheral side SIE 182 allows peripheral devices to be coupled to the device 224' in a manner such that these devices appear connected to the USB host controller of another system. For instance, as shown in FIG. 7, a second host system B includes a standard USB controller 124 including host controller logic 140, host side SIE 142, and differential ports 146 and 148, and is similar to that illustrated in FIG. 2. System B is connected to system A with a cable 710 capable of carrying differential signals. System B can now access non-USB devices attached to the UDS 224" of system A, via USB peripheral side SIE 182 and programmable USB emulation unit 184.

Some of the advantages of a system in accordance with the invention are now described with respect to audio speaker support. FIG. 8A shows a conventional non-USB audio system. Audio controller 302 retrieves packed audio data from system memory 104 and/or from a long term storage device, such as a CD, via controller 108. The audio controller 302 unpacks the data and transmits it to a CODEC 304, which processes the data, including digital-to-analog conversion, for output to speaker 306. Generally, audio controllers 302 are expensive and consume considerable power, and are therefore undesirable in laptop systems. In addition, because of the industry move toward standardization and user-friendly systems many hardware vendors are suggesting that amenities, such as audio, be supported as USB devices.

FIG. 8B demonstrates support for a USB speaker. In FIG. 8b, packed audio data is retrieved, unpacked, and placed in memory 104 by processor 102. The unpacked data is fetched, via system controller 108, by USB interface controller unit 124. Using the SIE and differential port, the USB interface controller unit 124 places the data into USB serial format and sends it, via differential signaling, to USB speaker 308. The USB speaker receives and decodes the data with a differential port and an SIE 310. SIE 310 outputs the raw data to CODEC 312, which performs analog conversion and otherwise places the data in appropriate format for speaker 314. This USB method involves costly and complex components, both on the host side and device side, and usurps a considerable amount of system power, and is therefor also undesirable in laptop systems.

FIG. 8C demonstrates support for audio speakers using a UDS system in accordance with the present invention. Processor 106 retrieves and unpacks audio data and places the unpacked audio data in memory 104. The unpacked data is then transmitted, via system controller 108, to UDS 224. In UDS 224, programmable USB emulation unit 184, has previously been programmed (e.g., on power-up) to place data in a format appropriate for the particular audio application. UDS 224 serializes the data and formats it into the appropriate programmed format and then transmits the data to CODEC 316. CODEC 316, which in one embodiment is in accordance with the AC97 standard, processes the data and transmits it to speaker 318. Thus, the system is simple compared to USB, power consumption is minimized by avoiding use of audio controllers and by eliminating a differential signaling interface, while at the same time available real estate is maximized. The cost of systems utilizing UDS will also be minimized over the alternatives demonstrated in FIGS. 8A and 8B.

It is to be understood by those of skill in the art that the programmable USB emulation units and other aspects of a system in accordance with the invention illustrated and discussed with respect to FIGS. 5–7 can be implemented in hardware, software, firmware, or any combination thereof.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A device for use in a computer system having a system bus, said computer system designed to interoperate with a USB peripheral device through a USB interface controller unit, said USB interface controller unit including a USB controller interface to said system bus, said device comprising:
   a first interface to said system bus, said first interface appearing, to said computer system, identical to said USB controller interface;
   a second interface to a non-USB peripheral device; and
   a data formatter in a data path between said first interface and said second interface, said data formatter converting data between a system bus data format at said first interface, and a second data format at said second interface, said second data format being programmable.

2. The device of claim 1, wherein said second data format is programmed to serialize data.

3. The device of claim 1, further storing a USB device identifier.

4. The device of claim 3, further including a programmable register, wherein said programmable register stores said USB device identifier.

5. A device for use in a computer system having a system bus, said computer system designed to interoperate with a USB peripheral device through a USB interface controller unit, said USB interface controller unit including a USB controller interface to said system bus, said device comprising:
   a first interface to said system bus, said first interface appearing, to said computer system, identical to said USB controller interface;
   a port couplable to a non-USB peripheral device; and
   a programmable USB emulation unit in communication with said first interface to receive data from said system bus, and to transmit said data to said port, said programmable USB emulation unit including a data formatter, said data formatter capable of formatting said data received from said system bus in accordance with one of a plurality of non-USB data formats for said port, said programmable USB emulation unit further storing a USB device identifier.

6. The device of claim 5, wherein said data formatter includes a data serializer.

7. The device of claim 5, further comprising:
   a USB host side SIE in communication with said first interface; and
   a USB peripheral side SIE in communication with said host side SIE and said programmable USB emulation unit.

8. The device of claim 7, further including a USB differential port in communication with said host side SIE.

9. The device of claim 8, further including a USB differential port in communication with said USB peripheral side SIE.

10. A device for use in a computer system having a system bus, said computer system designed to interoperate with USB peripherals through said system bus, said device comprising:
    an interface to said system bus;
    a non-USB digital port couplable to a non-USB peripheral device; and
    means for emulating a USB peripheral device to said system bus on behalf of said non-USB peripheral device, said means for emulating including a data formatter that is programmable to support any of a plurality of data formats at said non-USB port.

11. The device of claim 10, wherein said means for emulating includes:
    means for receiving information from said computer system intended for said USB peripheral device;
    means for translating said information into a format readable by said non-USB peripheral device; and
    means for storing a USE identifier on behalf of said USB peripheral device.

12. A computer system, comprising:
    a processor;
    a memory;
    a system bus in communication with said processor and said memory; and
    a USB data serializer in communication with said system bus in a like manner to a USB interface controller unit, said USB data serializer couplable to carry data between said system bus and a non-USB peripheral device.

13. The computer system of claim 12, wherein said USB data serializer includes a data formatter, said data formatter having an input for receiving data obtained from said system bus and having an output for carrying said data in a format usable by said non-USB peripheral device.

14. The computer system of claim 13, wherein said data formatter operates bi-directionally, receiving data from said non-USB peripheral device and providing said data to said system bus.

15. The computer system of claim 13, wherein said USB data serializer further stores a USB peripheral device identifier.

16. A method of emulating a USB peripheral device in a computer system including a processor, a memory, and a system bus in communication with said processor and said memory, comprising the steps of:
    communicating, by an interface device, a USB device identifier to said computer system;
    configuring, by said computer system, said computer system to operate with a USB peripheral device identified by said USB device identifier;
    receiving, by said interface device, information from said computer system intended for said USB peripheral device;
    translating said information into a format readable by a non-USB device;
    communicating said translated information to said non-USB device; and
    programming said interface device to translate said information into said format, where said format is one of a plurality of formats programmable.

17. The method of claim 16, wherein said step of programming further includes programming said interface device with said USB device identifier.

18. A device for use in a computer system having a system bus, said computer system designed to interoperate with a USB peripheral device through a USB interface controller unit, said USB interface controller unit including a USB controller interface to said system bus, said device comprising:
    a first interface to said system bus, said first interface appearing, to said computer system, identical to said USB controller interface;
    a second interface to a non-USB peripheral device, said non-USB peripheral device including a non-USB speaker; and a data formatter in a data path between said first interface and said second interface, said data formatter converting data between a system bus data format at said first interface, and a second data format at said second interface, said second data format being programmable.

19. A device for use in a computer system having a system bus, said computer system designed to interoperate with a USB peripheral device through a USB interface controller unit, said USB interface controller unit including a USB controller interface to said system bus, said device comprising:

a first interface to said system bus, said first interface appearing, to said computer system, identical to said USB controller interface;

a port couplable to a non-USB peripheral device, said non-USB peripheral device including a non-USB speaker; and a programmable USB emulation unit in communication with said first interface to receive data from said system bus, and to transmit said data to said port, said programmable USB emulation unit including a data formatter, said data formatter capable of formatting said data received from said system bus in accordance with one of a plurality of non-USB data formats for said port, said programmable USB emulation unit further storing a USB device identifier.

20. A device for use in a computer system having a system bus, said computer system designed to interoperate with USB peripherals through said system bus, said device comprising:

an interface to said system bus;

a non-USB digital port couplable to a non-USB peripheral device, said non-USB peripheral device including a non-USB speaker; and means for emulating a USB peripheral device to said system bus on behalf of said non-USB peripheral device, said means for emulating including a data formatter that is programmable to support any of a plurality of data formats at said non-USB port.

21. A computer system, comprising:

a processor;

a memory;

a system bus in communication with said processor and said memory; and a USB data serializer in communication with said system bus in a like manner to a USB interface controller unit, said USB data serializer couplable to carry data between said system bus and a non-USB peripheral device, said non-USB peripheral device including a non-USB speaker.

22. A method of emulating a USB peripheral device in a computer system including a processor, a memory, and a system bus in communication with said processor and said memory, comprising the steps of:

communicating, by an interface device, a USB device identifier to said computer system;

configuring, by said computer system, said computer system to operate with a USB peripheral device identified by said USB device identifier;

receiving, by said interface device, information from said computer system intended for said USB peripheral device;

translating said information into a format readable by a non-USB device, said non-USB peripheral device including a non-USB speaker;

communicating said translated information to said non-USB device; and programming said interface device to translate said information into said format, where said format is one of a plurality of formats programmable.

\* \* \* \* \*